US012801108B2

(12) United States Patent
Chen et al.

(10) Patent No.: US 12,801,108 B2
(45) Date of Patent: Nov. 17, 2026

(54) MICRO-CONTROLLER CIRCUIT AND PROCESSING METHOD THEREOF

(71) Applicant: Nuvoton Technology Corporation, Hsinchu Science Park (TW)

(72) Inventors: Wei-Zong Chen, Taoyuan City (CN); Tzu-Lan Shen, Taoyuan City (TW)

(73) Assignee: Nuvoton Technology Corporation, Hsinchu Science Park (TW)

( * ) Notice: Subject to any disclaimer, the term of this patent is extended or adjusted under 35 U.S.C. 154(b) by 398 days.

(21) Appl. No.: 18/537,312

(22) Filed: Dec. 12, 2023

(65) Prior Publication Data

US 2024/0210904 A1 Jun. 27, 2024

(30) Foreign Application Priority Data

Dec. 21, 2022 (TW) ................................ 111149145

(51) Int. Cl.
*G05B 19/042* (2006.01)

(52) U.S. Cl.
CPC .. *G05B 19/042* (2013.01); *G05B 2219/25255* (2013.01); *G05B 2219/25257* (2013.01)

(58) Field of Classification Search
CPC ........ G05B 19/042; G05B 2219/25255; G05B 2219/25257
See application file for complete search history.

(56) References Cited

U.S. PATENT DOCUMENTS 9,442,523 B2 * 9/2016 Lee ........................ G06F 1/3231
11,639,981 B2 * 5/2023 Wu ........................ H04W 4/021 342/28
11,704,814 B2 * 7/2023 Arar ...................... G06N 3/0985 382/100
11,720,161 B2 * 8/2023 Iyer ....................... G06F 1/3206 713/323
2012/0287035 A1 * 11/2012 Valko .................... G06F 1/3231 713/323
2014/0149754 A1 * 5/2014 Silva ...................... G06F 3/017 713/300
2015/0134996 A1 * 5/2015 Pitigoi-Aron ............. G06F 1/08 713/400

(Continued)

FOREIGN PATENT DOCUMENTS

CN 109104493 A 12/2018
CN 111338913 A 6/2020

(Continued)

*Primary Examiner* — Aurel Prifti
(74) *Attorney, Agent, or Firm* — MUNCY, GEISSLER, OLDS & LOWE, P.C.

(57) ABSTRACT

A micro-controller circuit including a sensor circuit, a processing circuit, a storage circuit, and an adjustment circuit is provided. The sensor circuit senses a physical parameter to generate sense information. The processing circuit performs an operation on the sense information to generate a processed signal. The storage circuit stores the processed signal and predetermined information. The adjustment circuit utilizes a machine learning method to process the processed signal stored in the storage circuit to generate a learning result. In response to the learning result not matching the predetermined information, the adjustment circuit adjusts the predetermined information.

19 Claims, 3 Drawing Sheets

(56) References Cited

U.S. PATENT DOCUMENTS

| | | | | |
|---|---|---|---|---|
| 2016/0132091 | A1* | 5/2016 | Bodner | G06F 1/3206<br>713/323 |
| 2019/0148010 | A1* | 5/2019 | Aliamiri | A61B 5/0002<br>705/2 |
| 2020/0037053 | A1* | 1/2020 | Cobb | G01J 5/0025 |
| 2020/0200590 | A1* | 6/2020 | Aji | G01H 1/16 |
| 2021/0381960 | A1* | 12/2021 | Na | G01S 7/4816 |
| 2022/0329613 | A1* | 10/2022 | Abbaszadeh | H04L 63/1416 |
| 2023/0062290 | A1* | 3/2023 | Statescu | H04N 25/75 |
| 2025/0373238 | A1* | 12/2025 | Demenschonok | A61B 5/313 |

FOREIGN PATENT DOCUMENTS

| | | | |
|---|---|---|---|
| CN | 115204248 | A | 10/2022 |
| TW | 201918833 | A | 5/2019 |
| TW | 202039286 | A | 11/2020 |
| TW | 202213269 | A | 4/2022 |
| TW | 202219489 | A | 5/2022 |

* cited by examiner

MICRO-CONTROLLER CIRCUIT AND PROCESSING METHOD THEREOF

CROSS REFERENCE TO RELATED APPLICATIONS

This Application claims priority of Taiwan Patent Application No. 111149145, filed on Dec. 21, 2022, the entirety of which is incorporated by reference herein.

BACKGROUND OF THE INVENTION

Field of the Invention

The present invention relates to a micro-controller circuit, and, in particular, to a micro-controller circuit that utilizes a machine learning method to dynamically adjust a threshold value.

Description of the Related Art

When receiving multi sense information, most studies discuss the data alignment of sense information. The spatial information provided by the sense information is processed for optimal combination. When the sense information exceeds a threshold value, the back-end circuit will perform a specific operation. However, a fixed threshold cannot be applied to different environments. Therefore, the back-end circuits are activated frequently, increasing power consumption.

BRIEF SUMMARY OF THE INVENTION

In accordance with an embodiment of the disclosure, a micro-controller circuit comprises a sensor circuit, a processing circuit, a storage circuit, and an adjustment circuit. The sensor circuit senses a physical parameter to generate sense information. The processing circuit performs an operation on the sense information to generate a processed signal. The storage circuit stores the processed signal and predetermined information. The adjustment circuit utilizes a machine learning method to process the processed signal stored in the storage circuit to generate a learning result. In response to the learning result not matching the predetermined information, the adjustment circuit adjusts the predetermined information.

An exemplary embodiment of a processing method is described in the following paragraph. A physical parameter is sensed to generate sense information. A specific operation is performed on the sense information to generate a processed signal. A machine learning method is utilized to process the processed signal to generate a learning result. A determination is made as to whether the learning result matches predetermined information. In response to the learning result not matching the predetermined information, the predetermined information is adjusted.

Processing method may be practiced by the systems which have hardware or firmware capable of performing particular functions and may take the form of program code embodied in a tangible media. When the program code is loaded into and executed by an electronic device, a processor, a computer or a machine, the electronic device, the processor, the computer or the machine becomes a micro-controller circuit for practicing the disclosed method.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
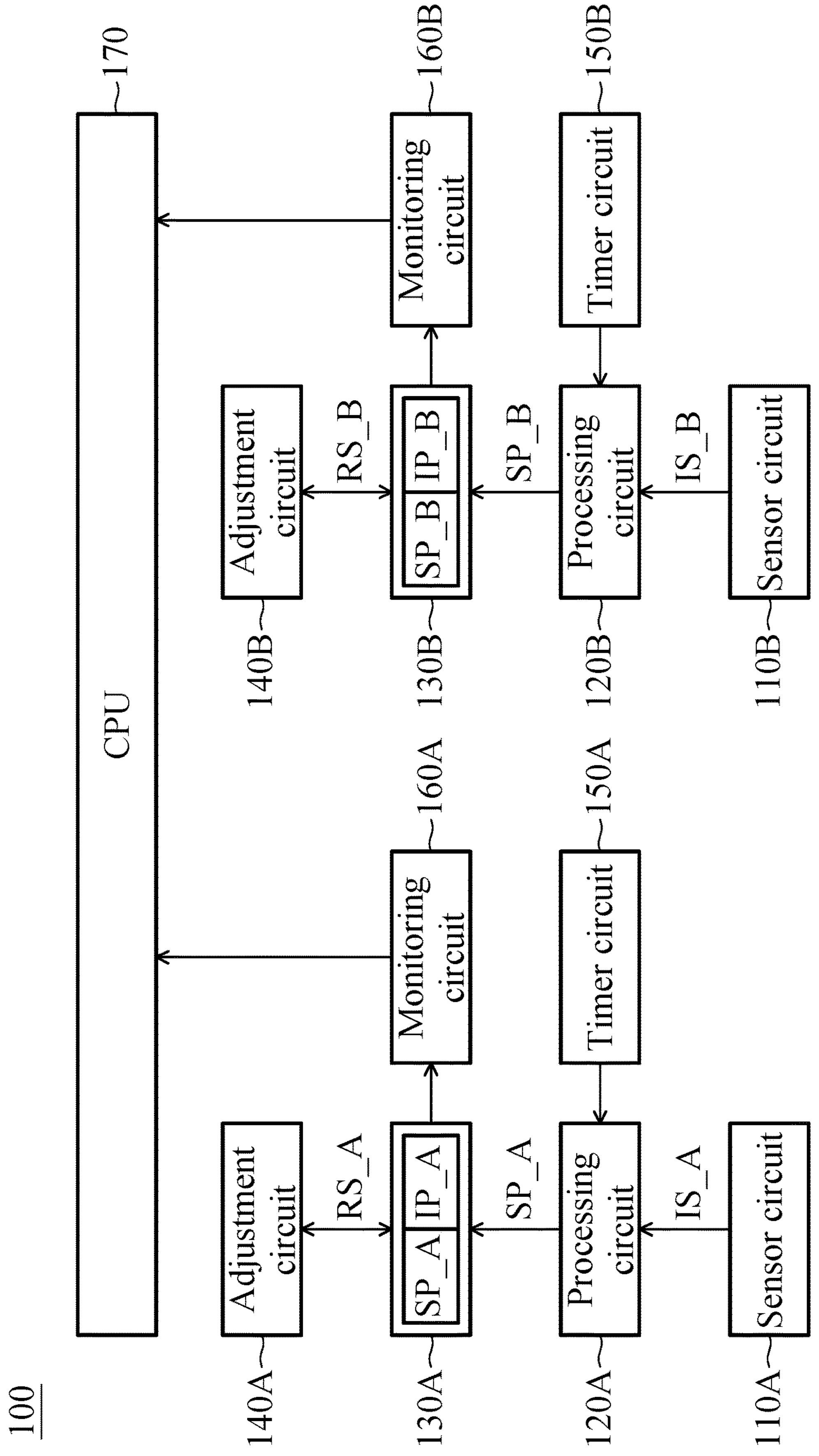
FIG. 1 is a schematic diagram of an exemplary embodiment of a micro-controller circuit according to various aspects of the present disclosure.

The present invention will be described with respect to particular embodiments and with reference to certain drawings, but the invention is not limited thereto and is only limited by the claims. The drawings described are only schematic and are non-limiting. In the drawings, the size of some of the elements may be exaggerated for illustrative purposes and not drawn to scale. The dimensions and the relative dimensions do not correspond to actual dimensions in the practice of the invention.

FIG. 1 is a schematic diagram of an exemplary embodiment of a micro-controller circuit according to various aspects of the present disclosure. The micro-controller circuit 100 comprises a sensor circuit 110A, a processing circuit 120A, a storage circuit 130A, and an adjustment circuit 140A. The sensor circuit 110A senses a physical parameter to generate sense information IS_A. The type of physical parameter is not limited in the present disclosure. In one embodiment, the physical parameter comprises at least one of a temperature parameter, a brightness parameter, a distance parameter, and a humidity parameter. The structure of sensor circuit 110A is not limited in the present disclosure. In one embodiment, the sensor circuit 110A at least comprises a sensor. The sensor may be a temperature sensor, a photo resistor, an inertial measurement unit (IMU), or a time of flight (TOF).

The processing circuit 120A performs a specific operation on the sense information IS_A to generate a processed signal SP_A. In one embodiment, the specific operation performing by the processing circuit 120A is a transmission operation. The processing circuit 120A may utilize a serial transmission or a parallel transmission to receive or output data. In another embodiment, the processing circuit 120A may utilize a serial transmission to receive data and utilizes a parallel transmission to output data. In some embodiments, the processing circuit 120A may utilize a parallel transmission to receive data and utilizes a serial transmission to output data. The structure of processing circuit 120A is not limited in the present disclosure. In one embodiment, the processing circuit 120A is a communication interface (such as a serial peripheral interface (SPI)), or an universal asynchronous receiver/transmitter (UART).

In some embodiment, the processing circuit 120A is a conversion circuit, such as an analog-to-digital converter (ADC). In such case, the specific operation performed by the processing circuit 120A is a conversion operation to convert the sense information IS_A from an analog format to a digital format. In other embodiments, the processing circuit 120A is a comparator circuit. In such case, the specific operation performed by the processing circuit 120A is a comparing operation. The comparing operation is performed to compare the sense information IS_A and predetermined information and serves the compared result as the processed signal SP_A.

The storage circuit 130A stores the processed signal SP_A and the predetermined information IP_A. The predetermined information IP_A may comprise at least one threshold value. For example, the predetermined information IP_A may comprise a high threshold value and a low threshold value to represent an upper limit and a lower limit of the temperature. In other embodiment, the predetermined information IP_A may comprise six threshold values, such as three-axis angular velocity threshold values and the three-axis acceleration threshold values. In some embodiments, the predetermined information IP_A is previously stored in the storage circuit 130A. In other embodiments, the storage circuit 130A collects and stores many processed signals SP_A which are generated by the processing circuit 120A at different time points. In one embodiment, the storage circuit 130A is a direct memory access buffer.

The adjustment circuit 140A utilizes a machine learning method to process the processed signal SP_A stored in the storage circuit 130A to generate a learning result RS_A. In this embodiment, the adjustment circuit 140A utilizes the machine learning method to perform learning and training operations on the processed signal SP_A stored in the storage circuit 130A. Then the adjustment circuit 140A determines whether to adjust the predetermined information IP_A according to the learning result RS_A.

In one embodiment, when the learning result RS_A matches the predetermined information IP_A, the adjustment circuit 140A does not adjust the predetermined information IP_A. However, when the learning result RS_A does not match the predetermined information IP_A, the adjustment circuit 140A adjusts the predetermined information IP_A stored in the storage circuit 130A. In one embodiment, the adjustment circuit 140A adjusts at least one threshold value of the predetermined information IP_A.

The present disclosure does not limit how the adjustment circuit 140A adjusts the predetermined information IP_A stored in the storage circuit 130A. In one embodiment, the adjustment circuit 140A writes the learning result RS_A to the storage circuit 130A to replace the predetermined information IP_A stored in the storage circuit 130A.

The type of machine learning method is not limited in the present disclosure. In one embodiment, the adjustment circuit 140A performs an extraction model for the processed signal SP_A stored in the storage circuit 130A. The extraction model may be a neural network (NN) or a deep learning. The neural network uses neurons to perform a nonlinear feature transformation. The deep learning uses many neuron layers to perform multiple nonlinear feature transformations. In some embodiments, the adjustment circuit 140A utilizes a backpropagation neural network method, a support vector machine method, an adaptive boosting method or a decision tree method to perform the feature transformation for the processed signal SP_A stored in the storage circuit 130A. The structure of adjustment circuit 140A is not limited in the present disclosure. In one embodiment, the adjustment circuit 140A is a neural network processing unit (NPU).

In other embodiments, the micro-controller circuit 100 further comprises a timer circuit 150A, a monitoring circuit 160A, and a central processing unit (CPU) 170. When the CPU 170 operates in a normal mode, the CPU 170 performs a specific program code. When the CPU 170 performs a sleep command in the specific program code, the CPU 170 exits the normal mode and enters a low-power mode. In the low-power mode, the CPU 170 operates in a sleep state.

When the CPU 170 enters the low-power mode, the sensor circuit 110A works normally. At this time, the timer circuit 150A may direct the processing circuit 120A to process the sense information IS_A to generate the processed signal SP_A at every fixed time interval. The storage circuit 130A collects more records of sense information IS_A which are generated by the processing circuit 120A at different time points. The monitoring circuit 160A determines whether the processed signal SP_A stored in the storage circuit 130A matches the predetermined information IP_A. When the processed signal SP_A does not match the predetermined information IP_A, the monitoring circuit 160A wakes up the CPU 170. Therefore, the CPU 170 exits the low-power mode and enters the normal mode. In this embodiment, the predetermined information IP_A has been updated by the adjustment circuit 140A before the CPU 170 enters the low-power mode. Therefore, the CPU 170 does not be woken up frequently, it can achieve the effect of energy saving.

For example, assume that the sensor circuit 110A is a temperature sensor and the manufacturer has set a high threshold value and a low threshold value of the predetermined information IP_A to 0. After the micro-controller circuit 100 produced by the manufacturer leaves the factory and is disposed in a corresponding device, when the micro-controller circuit 110 operates in a normal mode, the timer circuit 150A triggers the processing circuit 120A at every fixed time interval (e.g., 3 seconds). The processing circuit 120A reads and processes the sense information IS_A. The storage circuit 130A collects the processed signals SP_A. The adjustment circuit 140A executes the feature transformation for the processed signal SP_A of the storage circuit 130A to generate a transformed result and updates the predetermined information IP_A according to the transformed result. In one embodiment, the adjustment circuit 140A utilizes the processed signal SP_A stored in the storage circuit 30A to estimate that the temperature of the environment where the micro-controller circuit 100 is located is about 37.5~40 degrees. Therefore, the adjustment circuit 140A sets the high threshold value of the predetermined information IP_A to 40 and sets the low threshold value of the predetermined information IP_A to 37.5.

When the CPU 170 enters the low-power mode, the sensor circuit 110A continues to sense the physical parameter to generate the sense information IS_A. The processing circuit 120A processes the sense information IS_A to generate the processed signal SP_A. The storage circuit 130A stores the processed signal SP_A. The monitoring circuit 160A reads the processed signal SP_A stored in the storage circuit 130A. When the temperature corresponding to the processed signal SP_A is within 37.5~40 degrees, this indicates that the processed signal SP_A matches the predetermined information IP_A. Therefore, the monitoring circuit 160A does not wake up the CPU 170. The CPU 170 continues to operate in the low-power mode. However, when the temperature corresponding to the processed signal SP_A is not within 37.5~40 degrees, this indicates that the temperature where the micro-controller circuit 100 is located is abnormal. At this time, since the processed signal SP_A does not match the predetermined information IP_A, the monitoring circuit 160A wakes up the CPU 170. The CPU 170 exits the low-power mode and enters the normal mode. In one embodiment, the CPU 170 sends out a warning message to notify the user that the ambient temperature is abnormal.

When the CPU 170 operates in a normal mode (regardless of whether the CPU 170 is woken by the monitoring circuit 160A), the adjustment circuit 140A uses a machine learning technology to appropriately adjust the predetermined information IP_A to suit different environments. Therefore, after the CPU 170 enters the low-power mode, when the processed signal SP_A does not match the predetermined information IP_A, the CPU 170 will be woken up. The CPU 170 will not be woken up frequently, so it can save the power consumption of the micro-controller circuit 100. In some embodiments, when the CPU 170 is woken up, the adjustment circuit 140A appropriately adjusts the predetermined information IP_A. However, when the CPU 170 enters the low-power mode, the adjustment circuit 140A stops adjusting the predetermined information IP_A.

In other embodiments, when the CPU 170 enters the low-power mode, the timer circuit 150A works normally. At this time, the sensor circuit 110A, the processing circuit 120A, the storage circuit 130A, and the monitoring circuit 160A may work normally. In another embodiment, when the CPU 170 enters the low-power mode, the sensor circuit 110A, the processing circuit 120A, the storage circuit 130A, and the monitoring circuit 160A stop working temporarily. In this case, the timer circuit 150A wakes up the sensor circuit 110A, the processing circuit 120A, the storage circuit 130A, and the monitoring circuit 160A at every fixed time interval.

In other embodiments, the processing circuit 120A can be omitted. In this case, the storage circuit 130A directly receives the sense information IS_A from the sensor circuit 110A. The adjustment circuit 140A determines whether to adjust the predetermined information IP_A according to the sense information IS_A stored in the storage circuit 130A. When the CPU 170 enters the low-power mode, the timer circuit 150A triggers the sensor circuit 110A in fixed intervals of time. The storage circuit 130A stores the sense information IS_A. When the sense information IS_A does not match the predetermined information IP_A, the monitoring circuit 160A wakes up the CPU 170.

In one embodiment, the micro-controller circuit 100 further comprises a sensor circuit 110B, a processing circuit 120B, a storage circuit 130B, and an adjustment circuit 140B. The sensor circuit 110B senses another physical parameter to generate a sense information IS_B. In some embodiments, the physical parameter sensed by the sensor circuit 110B is different from the physical parameter sensed by the sensor circuit 110A.

The processing circuit 120B performs a specific operation on the sense information IS_B to generate a processed signal SP_B. The specific operation performed by the processing circuit 120B is related to its own type. For example, if the processing circuit 120B is a conversion circuit, the processing circuit 120B performs a conversion operation on the sense information IS_B, such as from an analog format to a digital format. Since the characteristics of the processing circuit 120B are similar to the characteristics of the processing circuit 120A, the description is omitted here. In one embodiment, the type of processing circuit 120B is different from the type of processing circuit 120A. In this case, the specific operation performed by the processing circuit 120B is different from the specific operation performed by the processing circuit 120A.

The storage circuit 130B stores the processed signal SP_B and predetermined information IP_B. Since the characteristics of the storage circuit 130B are similar to the characteristics of the storage circuit 130A, the description is omitted here. In one embodiment, the storage circuits 130A and 130B are different memory blocks in the same memory element. For example, a memory has a first memory block, a second memory block, a third memory block, and a fourth memory block. In this case, the first memory block stores the processed signal SP_A, the second memory block stores the predetermined information IP_A, the third memory block stores the processed signal SP_B, and the fourth memory block stores the predetermined information IP_B.

The adjustment circuit 140B utilizes a machine learning method to process the processed signal SP_B stored in the storage circuit 130B to generate a learning result RS_B. When the learning result RS_B does not match the predetermined information IP_B, the adjustment circuit 140B adjusts the predetermined information IP_B. Since the characteristics of the adjustment circuit 140B are similar to the characteristics of the adjustment circuit 140A, the description is omitted here. In one embodiment, the machine learning method used by the adjustment circuit 140B is the same as or different from the machine learning method used by the adjustment circuit 140A.

In other embodiments, the micro-controller circuit 100 further comprises a timer circuit 150B. When the CPU 170 enters the low-power mode, the timer circuit 150B triggers the processing circuit 120B at every fixed time interval to direct the processing circuit 120B to perform the specific operation on the sense information IS_B. Since the characteristics of the timer circuit 150B are similar to the characteristics of the timer circuit 150A, the description is omitted here. In one embodiment, the fixed time interval at which the timer circuit 150B triggers the processing circuit 120B is different from the fixed time interval at which the timer circuit 150A triggers the processing circuit 120A.

In some embodiment, the micro-controller circuit 100 further comprises a monitoring circuit 160B. When the CPU 170 enters the low-power mode, the monitoring circuit 160B determines whether the processed signal SP_B matches the predetermined information IP_B. When the processed signal SP_B does not match the predetermined information IP_B, the monitoring circuit 160B wakes up the CPU 170. However, when the processed signal SP_B matches the predetermined information IP_B, the monitoring circuit 160B does not wake up the CPU 170. Therefore, the CPU 170 continues operating in the low-power mode.

In other embodiments, when the CPU 170 enters the low-power mode, the sensor circuit 110A provides the predetermined information IP_A and the sensor circuit 110B provides the predetermined information IP_B. The processing circuit 120A processes the predetermined information IP_A to generate the processed signal SP_A. The processing circuit 120B processes the predetermined information IP_B to generate the processed signal SP_B. The monitoring circuit 160A determines whether the processed signal SP_A does not match the predetermined information IP_A. The monitoring circuit 160B determines whether the processed signal SP_B does not match the predetermined information IP_B. Assume that the processed signal SP_A does not match the predetermined information IP_A. In this case, the monitoring circuit 160A wakes up the CPU 170. Therefore, the CPU 170 enters the normal mode.

The present disclosure does not limit when the sensor circuits 110A and 110B provide the predetermined information IP_A and IP_B. The time point at which the sensor circuit 110A provides the predetermined information IP_A may be the same or different from the time point at which the sensor circuit 110B provides the predetermined information IP_B. Similarly, the time point at which the processing circuit 120A generates the processed signal SP_A may be the same or different from the time point at which the processing circuit 120B generates the processed signal SP_B. The time point at which the monitoring circuit 160A determines whether the processed signal SP_A matches the predetermined information IP_A may be the same or different from the time point at which the monitoring circuit 160B determines whether the processed signal SP_B matches the predetermined information IP_B.

When the CPU 170 operates in the normal mode, the adjustment circuits 140A and 140B use machine learning methods to generate two learning results. The adjustment circuits 140A and 140B determine whether to adjust the predetermined information IP_A and IP_B according to the corresponding learning result. Assume that the predetermined information IP_A has been adjusted by the adjustment circuit 140A. In this case, when the CPU 170 enters the low-power mode, the monitoring circuit 160A determines whether the processed signal SP_A matches the adjusted predetermined information IP_A. When the processed signal SP_A does not match the adjusted predetermined information IP_A, the monitoring circuit 160A wakes up the CPU 170. In one embodiment, after the adjustment circuit 140A adjusts the predetermined information IP_A, the adjustment circuit 140A asserts a finish signal. The CPU 170 enters the low-power mode according to the asserted finish signal.

Figure 2:
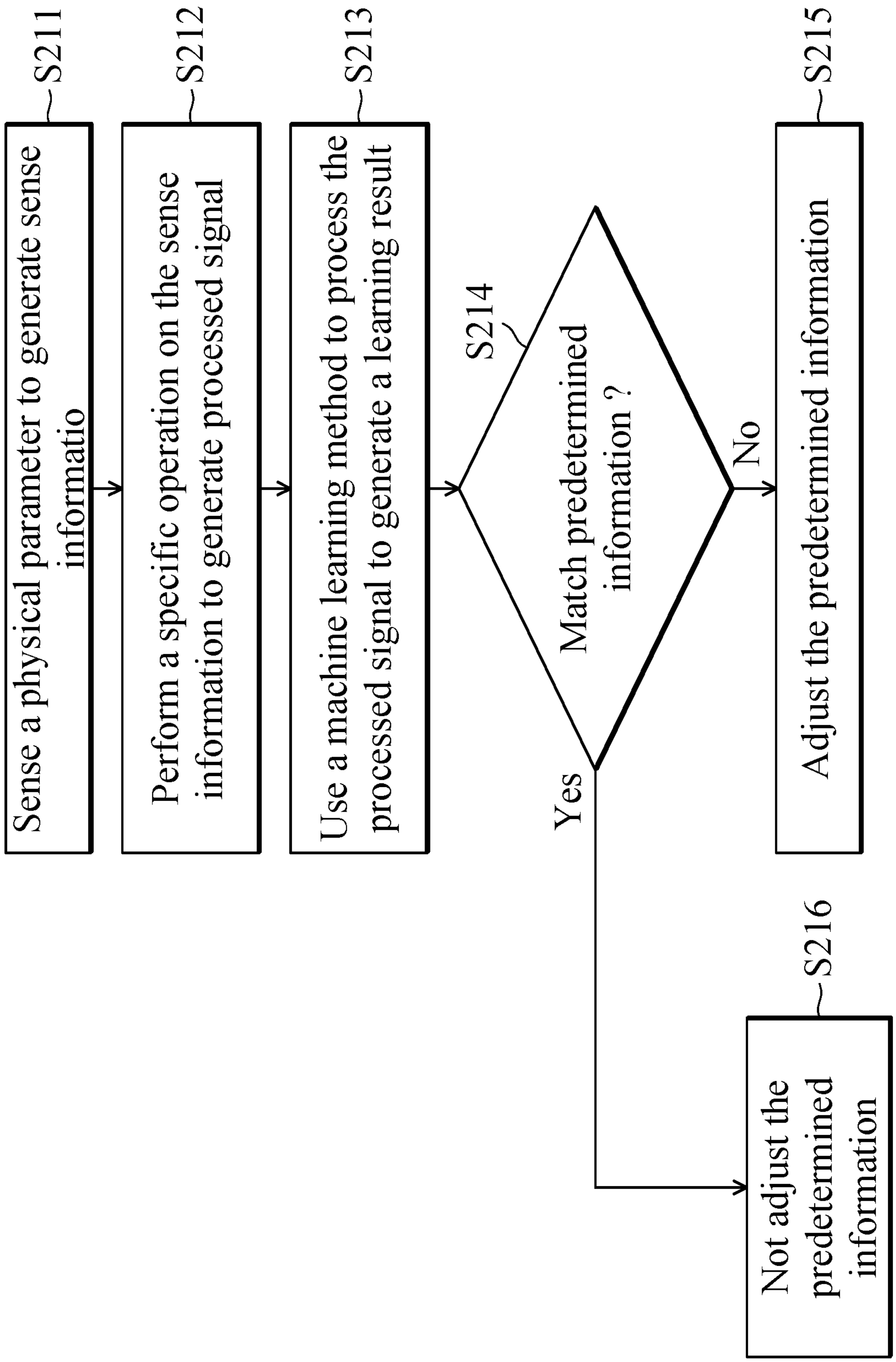
FIG. 2 is a flowchart of an exemplary embodiment of a processing method according to various aspects of the present disclosure.

FIG. 2 is a flowchart of an exemplary embodiment of a processing method according to various aspects of the present disclosure. The processing method may take the form of a program code. When the program code is loaded into and executed by a machine, the machine thereby becomes a micro-controller circuit for practicing the processing method. First, a physical parameter is sensed to generate sense information (step S211). In one embodiment, the physical parameter is at least one of a temperature parameter, a brightness parameter, a distance parameter, and a humidity parameter.

Next, a specific operation is performed on the sense information to generate processed signal (step S212). In one embodiment, the specific operation is a transmission operation. During the transmission operation, a serial transmission or a parallel transmission is used to receive the sense information and to output the sense information. In another embodiment, the specific operation is a conversion operation to convert the sense information, such as from an analog format into a digital format. In other embodiment, the specific operation is a comparing operation to compare the sense information with a reference value.

Then, a machine learning method is used to process the processed signal to generate a learning result (step S213). In one embodiment, the machine learning method is a neural network (NN) or a deep learning. The neural network may be a backpropagation neural network method, a support vector machine method, an adaptive boosting method or a decision tree method.

Next, a determination is made as to whether the learning result matches predetermined information (step S214). When the learning result does not match the predetermined information, the predetermined information is adjusted (step S215). In one embodiment, when the learning result does not match the predetermined information, step S215 is performed to replace the predetermined information with the learning result. However, when the learning result matches the predetermined information, the predetermined information does not be adjusted (step S216).

In other embodiments, after the processed signal is generated in step S212, the processed signal is stored in a direct memory access buffer. After many processed signal are collected, step S213 is performed to process the processed signals in the buffer. In this case, step S212 is performed to execute the specific operation on the sense information at regular time intervals (e.g., 3 seconds).

Figure 3:
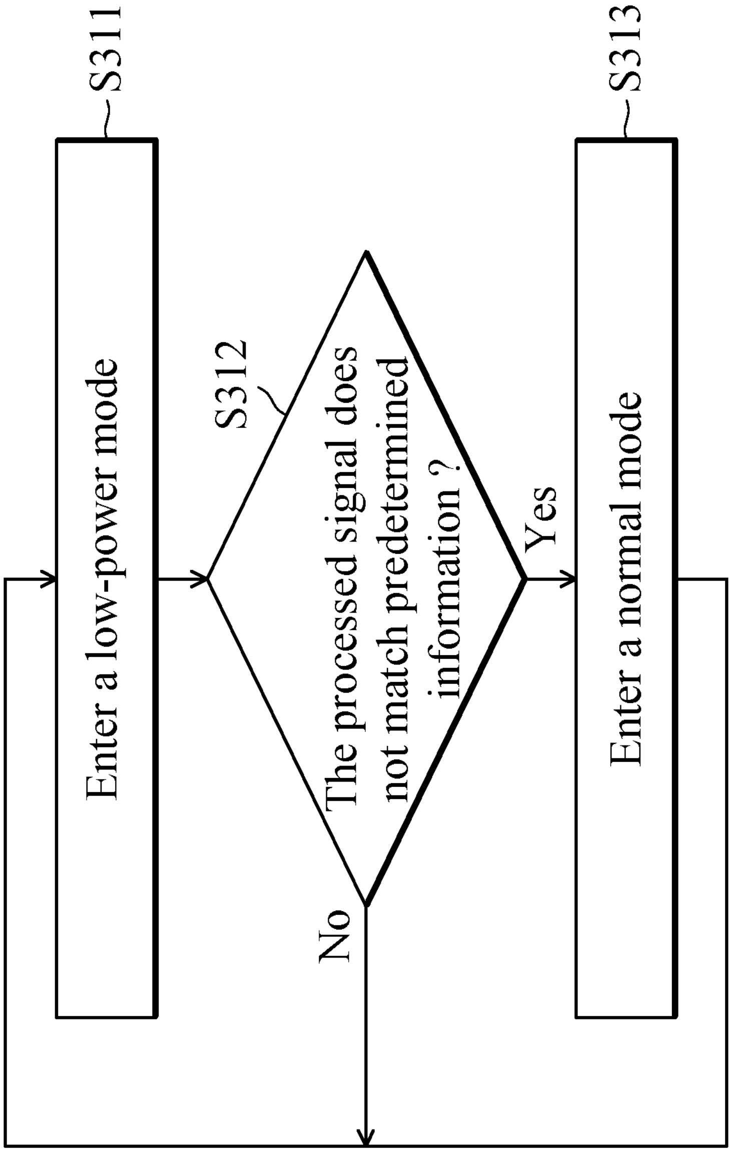
FIG. 3 is a schematic diagram of an exemplary embodiment of the operation of the micro-controller circuit according to various aspects of the present disclosure.

FIG. 3 is a schematic diagram of an exemplary embodiment of the operation of the micro-controller circuit according to various aspects of the present disclosure. First, the micro-controller circuit operates in a low-power mode (step S311). In one embodiment, a CPU in the micro-controller circuit enters the low-power mode according to a sleep command. In the low-power mode, the CPU stops working temporarily, but a timer circuit in the micro-controller circuit drives a sensor circuit in fixed intervals of time. The sensor circuit senses a physical parameter to generate sense information. In some embodiments, a processing circuit in the micro-controller circuit performs a specific operation on the sense information to generate a processed signal. In this case, the processing circuit performs the specific operation on the sense information at every fixed time interval. An adjustment circuit in the micro-controller circuit reads the processed signal.

Next, a determination is made as to whether the processed signal does not match predetermined information (step S312). When the processed signal matches the predetermined information, step S311 is performed and the micro-controller circuit continues to operate in the low-power mode. However, when the processed signal does not match the predetermined information, the micro-controller circuit exits the low-power mode and enters a normal mode (step S313). In the normal mode, the micro-controller circuit performs the processing method of FIG. 2 to dynamically adjust the predetermined information.

Then, when the CPU performs a sleep command, the CPU enters the low-power mode again (step S311). In one embodiment, before the CPU enters the low-power mode, the predetermined information has been adjusted. In this case, the CPU exits the low-power mode when the processed signal does not match the adjusted predetermined information. In other embodiments, when the CPU enters the low-power mode, stop determining whether the processed signal matches the predetermined information.

Since the micro-controller circuit dynamically adjusts the predetermined information according to the physical parameters in the environment, the CPU disposed in the micro-controller circuit does not be woken up frequently in the low-power mode. Furthermore, since the CPU operates in the low-power mode for a longer period of time, power saving results can be achieved.

Processing methods may take the form of a program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes a micro-controller circuit for practicing the methods. The methods may also be embodied in the form of a program code transmitted over some transmission medium, such as electrical wiring or cabling, through fiber optics, or via any other form of transmission, wherein, when the program code is received and loaded into and executed by a machine such as a computer, the machine becomes a micro-controller circuit for practicing the disclosed methods. When implemented on a general-purpose processor, the program code combines with the processor to provide a unique apparatus that operates analogously to application-specific logic circuits.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. It will be understood that although the terms "first," "second," etc. may be used herein to describe various elements, these elements should not be limited by these terms. These terms are only used to distinguish one element from another.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A micro-controller circuit comprising:

a first sensor circuit sensing a first physical parameter to generate first sense information;

a first processing circuit performing a first operation on the first sense information to generate a first processed signal;

a first storage circuit storing the first processed signal and first predetermined information;

a first adjustment circuit utilizing a machine learning method to process the first processed signal stored in the first storage circuit to generate a first learning result;

a central processing unit (CPU) entering a low-power mode according to a sleep command; and a first timer circuit, wherein:

in response to the first learning result not matching the first predetermined information, the first adjustment circuit adjusts the first predetermined information, in response to the CPU entering the lower-power mode, the first sensor circuit stops working, and the first timer circuit wakes up the first sensor circuit at every fixed time interval, in response to the first processed signal not matching the first predetermined information, the CPU is waked up to exit the low-power mode.

2. The micro-controller circuit as claimed in claim 1, wherein in response to the first learning result not matching the first predetermined information, the first adjustment circuit writes the first learning result to the first storage circuit to replace the first predetermined information.

3. The micro-controller circuit as claimed in claim 1, wherein the first timer circuit triggers the first processing circuit at every fixed time interval to direct the first processing circuit to perform the first operation on the first sense information.

4. The micro-controller circuit as claimed in claim 1, wherein the first adjustment circuit is a neural-network processing unit (NPU).

5. The micro-controller circuit as claimed in claim 1, further comprising:

a first monitoring circuit determining whether the first processed signal matches the first predetermined information in response to the CPU entering the low-power mode, wherein in response to the first processed signal not matching the first predetermined information, the first monitoring circuit wakes up the CPU.

6. The micro-controller circuit as claimed in claim 5, wherein:

in response to the CPU being woken up, the first adjustment circuit processes the first processed signal stored in the first storage circuit, and in response to the CPU entering the low-power mode, the first adjustment circuit stops processing the first processed signal stored in the first storage circuit.

7. The micro-controller circuit as claimed in claim 5, further comprising:

a second sensor circuit sensing a second physical parameter to generate second sense information;

a second processing circuit performing a second operation on the second sense information to generate a second processed signal;

a second storage circuit storing the second processed signal and second predetermined information; and a second adjustment circuit utilizing the machine learning method to process the second processed signal stored in the second storage circuit to generate a second learning result, wherein in response to the second learning result not matching the second predetermined information, the second adjustment circuit adjusts the second predetermined information.

8. The micro-controller circuit as claimed in claim 7, further comprising:

a second monitoring circuit determining whether the second processed signal matches the second predetermined information in response to the CPU entering the low-power mode, wherein in response to the second processed signal not matching the second predetermined information, the second monitoring circuit wakes up the CPU.

9. The micro-controller circuit as claimed in claim 7, wherein the first physical parameter is different from the second physical parameter.

10. The micro-controller circuit as claimed in claim 7, wherein the first operation is different from the second operation.

11. The micro-controller circuit as claimed in claim 1, wherein:

the first predetermined information comprises a first threshold value and a second threshold value, and in response to the first learning result not being within the first and second threshold values, the first adjustment circuit updates at least one of the first and second threshold values according to the first learning result.

12. The micro-controller circuit as claimed in claim 1, wherein in response to the first learning result matching the first predetermined information, the first adjustment circuit does not adjust the first adjustment circuit.

13. A processing method comprising:

sensing a physical parameter to generate sense information;

performing a specific operation on the sense information to generate a processed signal;

utilizing a machine learning method to process the processed signal to generate a learning result;

determining whether the learning result matches predetermined information;

adjusting the predetermined information in response to the learning result not matching the predetermined information;

determining that a central processing unit (CPU) enters a low-power mode; and in response to the CPU entering the lower-power mode:

stopping sensing the physical parameter;

re-sensing the physical parameter at every fixed time interval; and waking up the CPU to exit the low-power mode in response to the processed signal not matching the predetermined information.

14. The processing method as claimed in claim 13, further comprising:

replacing the predetermined information with the learning result in response to the learning result not matching the predetermined information.

15. The processing method as claimed in claim 13, further comprising:

performing the specific operation on the sense information at every fixed time interval.

16. The processing method as claimed in claim 13, wherein in response to the CPU entering the low-power mode, the specific operation is performed at every fixed time interval.

17. The processing method as claimed in claim 13, further comprising:

stopping the determination of whether the learning result matches the predetermined information in response to the CPU entering the low-power mode.

18. The processing method as claimed in claim 13, further comprising:

stopping the adjustment of the predetermined information in response to the learning result matching the predetermined information.

19. The processing method as claimed in claim 13, wherein the machine learning method is a backpropagation neural network method, a support vector machine method, an adaptive boosting method or a decision tree method.

* * * * *